(12) United States Patent
Carmen et al.

(10) Patent No.: US 6,833,789 B1
(45) Date of Patent: Dec. 21, 2004

(54) UTENSIL METAL DETECTOR

(76) Inventors: Billy W. Carmen, 15500 Erwin St. #1049, Van Nuys, CA (US) 91411; C. M. Suen, 119 How Ming St. Flat C 6/F 180 Kwun Tong, Kowloon (HK)

( * ) Notice: Subject to any disclaimer, the term of this patent is extended or adjusted under 35 U.S.C. 154(b) by 94 days.

(21) Appl. No.: 10/253,189

(22) Filed: Sep. 23, 2002

Related U.S. Application Data

(60) Provisional application No. 60/324,356, filed on Sep. 24, 2001.

(51) Int. Cl.[7] .............................................. G08B 13/24
(52) U.S. Cl. ...................... 340/551; 340/500; 340/540; 340/568.1; 340/552; 324/326; 324/239
(58) Field of Search ................................ 340/551, 500, 340/540, 541, 568.1, 552; 324/326, 329, 228, 239

(56) References Cited

U.S. PATENT DOCUMENTS

| | | | | |
|---|---|---|---|---|
| 4,367,138 A | * | 1/1983 | Kustas | 209/224 |
| 4,494,657 A | * | 1/1985 | Oldenkamp | 209/636 |
| 4,632,253 A | * | 12/1986 | Stromgren et al. | 324/234 |
| 4,742,339 A | * | 5/1988 | Baziuk | 340/568.1 |
| 5,001,425 A | * | 3/1991 | Beling et al. | 324/239 |
| 5,576,621 A | * | 11/1996 | Clements | 324/239 |
| 5,659,247 A | * | 8/1997 | Clements | 324/239 |
| 5,797,497 A | * | 8/1998 | Edwards | 209/570 |

* cited by examiner

Primary Examiner—Jeffery Hofsass
Assistant Examiner—Daniel Previl
(74) Attorney, Agent, or Firm—Lee W. Tower

(57) ABSTRACT

A trashcan mounted apparatus for scanning for metal objects is provided. The apparatus includes a mounting lip adapted to conform to the top periphery of the trashcan and adapted to removably mount to and surround the aperture of the trashcan. A funnel shaped entryway extends from the mounting lip. A plurality of vertical walls are below the mounting lip and the top periphery of the trashcan and are attached to the funnel shaped entryway and form an opening to the trashcan. A detector coil surrounds the vertical walls for detecting metal passing through the opening. Control electronics coupled to the detector coil includes a speaker and a light indicator for warning that the detector coil has detected metal passing through the opening. A counter displays the number of times the detector coil has detected metal passing through the opening. A gain adjust is provided for adjusting the sensitivity of the detector coil.

10 Claims, 4 Drawing Sheets

US 6,833,789 B1

UTENSIL METAL DETECTOR

CROSS-REFERENCE OF RELATED APPLICATION

This application claims the benefit of U.S. provisional application No. 60/324,356 filed on Sep. 24, 2001.

BACKGROUND OF THE INVENTION

1. Field of the Invention

This invention relates to metal detectors.

2. Description of the Related Art

Restaurants, hotels, medical facilities and other businesses and establishments, often have a difficult time visually sorting metal items, which would normally be re-used, from waste products being discarded. Restaurant and hotel employees often, unintentionally, discard silverware and flatware when cleaning plates. Hospital employees may discard medical or surgical instruments that are designed to be re-used. Others may discard recyclable or reusable metal items unintentionally. Hospital employees may inadvertently discard needles into a container that is meant for other purposes. Metal detectors can be used to detect metal items such as silverware, flatware, medical instruments and recyclables; however, existing metal detectors are not properly designed for the task. A metal detector needs to be physically adapted for the use to which it will be put. For example, a metal detector used for security purposes would not be practical or useful for finding metal objects in trash, in a quick and convenient manner. Restaurants typically must replace lost silverware and flatware that has been accidentally discarded with food scraps, leading to additional operating expense. Similarly, hospitals and other establishments may accidentally dispose of instruments, leading to additional expense.

Accordingly, there is a need in the art for a metal detector that can alert employees to the presence of metal objects being placed in a trash can unintentionally.

SUMMARY OF THE INVENTION

It is an object of the present invention to provide a detector that can detect metal objects.

It is another object of the present invention to provide a detector that can be mounted on top of a trashcan, or other receptacle.

It is another object of the present invention to provide an alert to the user/employee that a metal object has been discarded in said trashcan or receptacle.

It is another object of the present invention to provide a means to adjust the sensitivity of the detector so as to detect only those items typically discarded by accident in such an establishment.

It is another object of the present invention to provide a record of the number of metal objects that have been discarded, with provisions for a supervisor or other person to prevent others from resetting the counter number to zero.

Other objects and many of the attendant features of this invention will be more readily appreciated as the same becomes better understood by reference to the following detailed descriptions and considered in connection with the accompanying drawings in which like reference symbols designate like parts throughout the figures.

DETAILED DESCRIPTION

Figure 1:
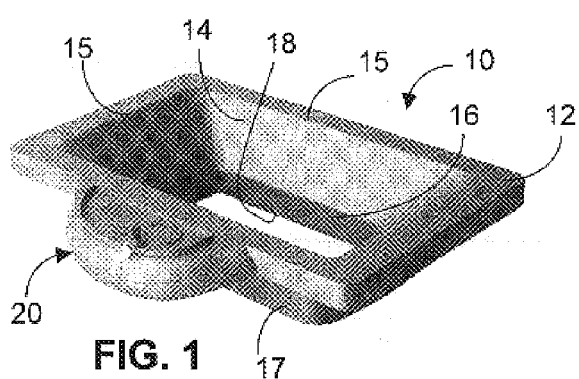
FIG. 1 is a perspective view showing the utensil metal detector with an opening, that is surrounded by a detector coil, through which trash and other items to be scanned for metal objects are passed in accordance with the present invention.
Figure 3:
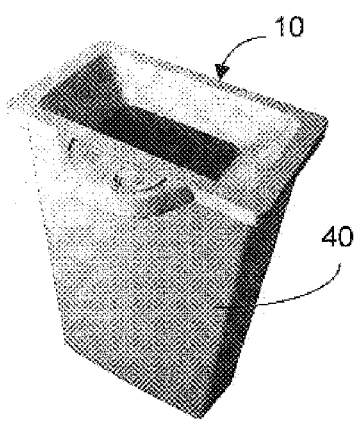
FIG. 3 is a perspective view of the utensil metal detector attached to the top of a trash receptacle in accordance with the present invention.
Figure 6:
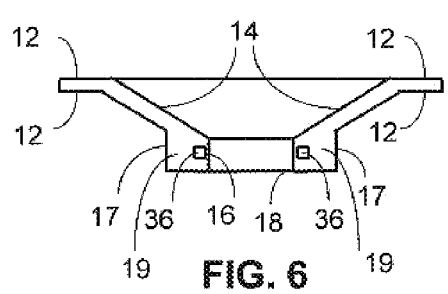
FIG. 6 is a sectional elevational view of the utensil metal detector along line 6—6 of FIG. 4 showing the mounting lip, the funnel shaped entryway, and the coil positoned around the opening in accordance with the present invention.

Referring now to the figures, FIG. 1 shows a perspective view showing the utensil metal detector 10, which has a waterproof and liquid-proof design to prevent wet items such as food from harming the apparatus and also to provide for easy cleaning. The utensil metal detector 10 has a funnel-shaped entryway 14 leading to an opening 18, through which trash, waste products, or other items to be scanned for metal, are passed. The funnel-shaped entryway 14 guides the items put into the trash to the opening 18, which makes the metal detector easy to use and prevents a "time penalty" in using the metal detector. The utensil metal detector 10 has a mounting lip 12, which is designed to conform to the top of a standard trashcan or receptacle. One such standard restaurant-style trashcan is commonly referred to in the restaurant/hospitality industries as a Wall Hugger™ or a "Slim Jim". FIG. 3 shows the utensil metal detector 10 mounted on top of trashcan or receptacle 40. The mounting lip 12 surrounds the top of the receptacle so that the only way to place items in the receptacle is through the opening 18 in the metal detector, which is surrounded by a detector coil in the utensil metal detector 10. As shown in FIG. 1, the mounting lip 12 is adapted to extend around the perimeter of the top of a receptacle. The funnel shaped entryway 14 extends from the inside perimeter 15 of the mounting lip 12 to the inside vertical wall 16 forming the opening 18. Between the inside vertical wall 16 and an outside vertical wall 17, a detector coil 36 is placed as shown in FIG. 6. When the utensil metal detector 10 is snuggly fitted on the receptacle, the only way to place items in the receptacle is through the opening 18 and therefore adjacent to the surrounding detector coil 36.

A control panel 20 is attached to the outside of the mounting lip 12 as shown in FIG. 1. The control panel 20, has an On/Off switch 22, which can be key operated to prevent employees from turning the utensil metal detector 10 Off. The sensitivity of the metal detector can be adjusted by turning sensitivity gain adjust dial 24. A sensitivity light indicator 26 is used to adjust the gain by testing the metal detector with various items, such as flatware or other utensils or tools. When the detector is properly adjusted the sensitivity light indicator 26 will light when metal is detected. The sensitivity adjust gain dial 24 allows the apparatus to be set to detect objects of a minimum size and metal density. For example, a restaurant owner wants to prevent discarding of flatware and silverware. However, the restaurant owner does not want to detect a small piece of aluminum foil, which may have been used in the preparation of such food. The sensitivity gain adjust allows the apparatus to be set to detect items of greater metallic content such as a teaspoon, while allowing objects of lesser metallic density, such as aluminum foil pieces, to pass through without detection.

A counter display 30 is provided to indicate the number of metal detections. When a metal object passes through the detector coil, the counter display 30 increments by 1. The counter display can be reset with reset button. 28 as further explained below. The reset button 28 can be interlocked via key on/off switch 22 so those employees without the key cannot reset the counter display 30. Power for the control panel circuity is either provided by a 9 volt battery or by externally provided DC power through plug 32, which is mounted on the side of the control panel.

Figure 4:
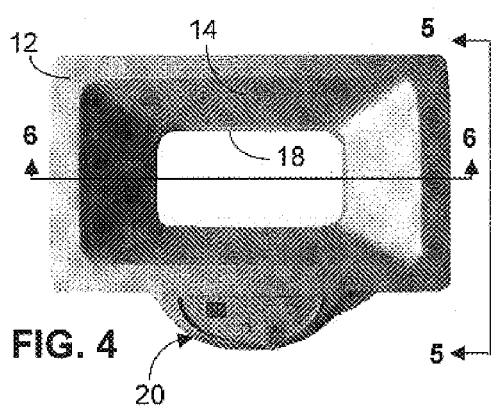
FIG. 4 is a top view showing the mounting lip, the funnel shaped entryway, the opening in the utensil metal detector, and the control panel in accordance with the present invention.
Figure 5:
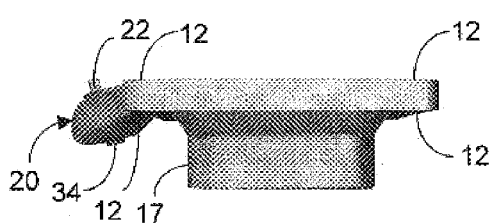
FIG. 5 is a side elevational view of the utensil metal detector along line 5—5 of FIG. 4 showing mounting lip, the control panel, and the coil housing that surrounds the opening and contains the coil in accordance with the present invention.

FIG. 4 is a top view showing the mounting lip 12, the funnel shaped entryway 14, the opening 18 in the utensil metal detector, and the control panel 20. FIG. 5 is a side elevational view of the utensil metal detector along line 5—5 of FIG. 4 showing mounting lip 12, the key on/off switch 22 and the speaker 34 mounted on the control panel 20, and the outside vertical wall 17. FIG. 6 is a sectional elevational view of the utensil metal detector along line 6—6 of FIG. 4 showing the mounting lip 12, the funnel shaped entryway 14, and the opening 18. The detector coil 36 is shown mounted between the inside vertical wall 16 and an outside vertical wall 17. The area between the inside vertical wall 16 and an outside vertical wall 17 is the coil housing 19.

Figure 7:
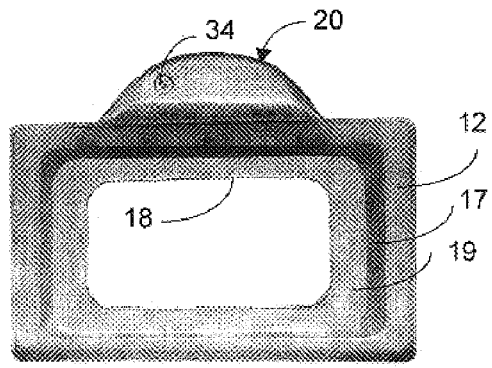
FIG. 7 is a bottom view of the utensil metal detector showing the mounting lip, the opening, and the speaker on the underside of the control panel in accordance with the present invention.

FIG. 7 is a bottom view showing the mounting lip 12, the opening 18, and the detector coil housing 19 between the inside vertical wall 16, which forms opening 18 and the outside vertical wall 17. A speaker 34 is shown mounted on the underside of the control panel 20. The speaker provides an audio alert that the detector coil 36 has detected metal. This alert can warn employees so that they will retrieve the item inadvertently place in the trash.

Figure 2:
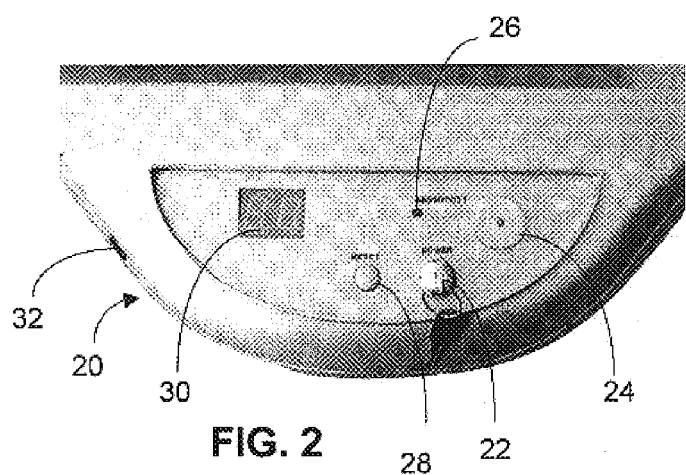
FIG. 2 is a top view of the utensil metal detector control panel, showing a counter display, reset button, sensitivity gain adjustment, sensitivity light indicator, and key on/off switch in accordance with the present invention.
Figure 8:
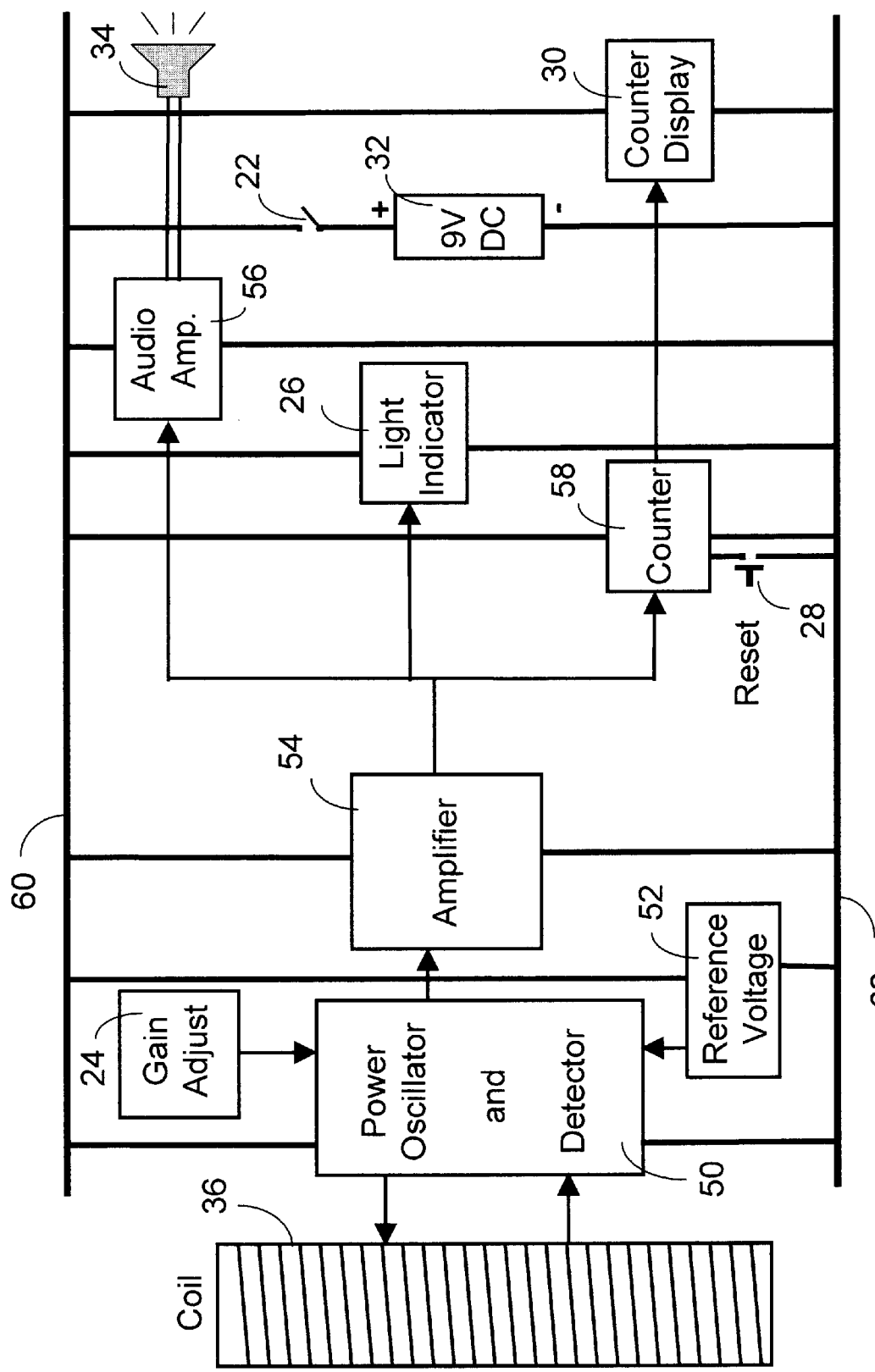
FIG. 8 is a circuit diagram for the utensil metal detector in accordance with the present invention.
Figure 9:
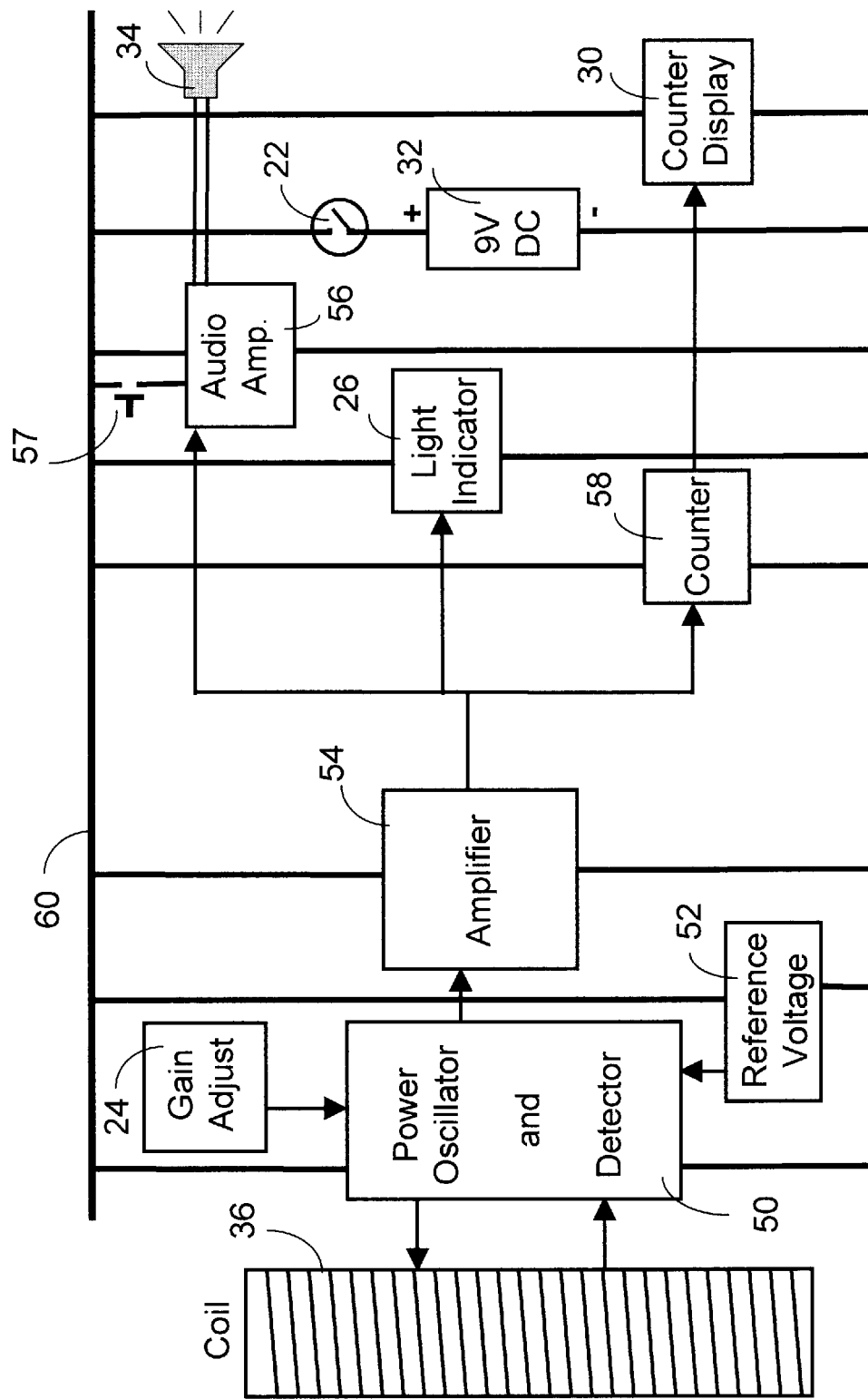
FIG. 9 is another circuit diagram for the utensil metal detector in accordance with the present invention.

FIG. 8 is a circuit diagram for the utensil metal detector. The power for the circuit is provided by 9 volt DC source 32 which can be either a battery or supplied externally through plug 32, shown on FIG. 2. The power is turned on via on/off switch 22, which as shown in FIG. 8 is a simple non-key operated switch. This can also be a keyed switch 22 as shown in FIG. 9, which requires a key to operate the switch so that employees without the key cannot turn the apparatus off. When switch 22 is on, then power is supplied to all the portions of the circuitry via power distribution line 60 and return 62. The reference voltage 52 circuit provides a stable voltage to power oscillator and detector 50 circuit. The power oscillator and detector 50 circuit applies power to the coil 36 and detects whether the magnetic field has changed. The power applied to the coil 36 depends on the gain adjust 24 setting. This gain adjusts the metal detection sensitivity of the coil. When metal is detected then the detection signal is amplified by amplifier 54 which causes the audio amplifier 56 to send an audio buzz or other audio alert to speaker 34, causes the light indicator 26 to light, and causes the counter 58 to increment by 1. The state of the counter 58 is sent to counter display 30. When the power is first turned on the counter 58 is set to zero.

As shown in FIG. 8, pushing reset button 28 can reset the counter 58. This may be useful, but may not give a proprietor a running total of the number of metal detections if each employee resets the counter. Alternately, as shown in FIG. 9, the control electronics can be designed so that the counter is not resettable by an employee. In this case, only when key on/off switch 22 is turned on, does the counter reset to zero. This implementation gives the owner a total count, and allows only the keeper of the key to reset the counter.

In the design shown in FIG. 8 the speaker puts out an audio alert each time a metal object is detected, but goes silent between detections. In the design shown in FIG. 9 the audio amplifier 56 once activated, continues to cause speaker 34 to put out an audio alert until the employee resets the audio alert via reset button 57, which can replace reset button 28 used in the design of FIG. 8. This continual alert causes the employee to take some action, such as removing the item from the trash, and alerts others, who can monitor the employee and make sure that the employee is not just resetting the buzzer. Even if the employee resets the buzzer, the counter will still record the total number of detections.

To indicate that the utensil metal detector is on, the counter display 30 can be backlit, and if lit the user knows the apparatus is operating. A separate on light can also be provided.

The utensil metal detector has a unitary integral design and the top including the top of the mounting lip 12, funnel-shaped entryway 14, and control panel can be formed by a single plastic mold. The bottom including the coiling housing 19 and the bottom of the mounting lip 12 can also be formed by a single plastic mold. This provides a waterproof and liquid-proof design so that wet items such as food have no adverse affect on the apparatus and so that the apparatus is easy to clean.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope of the present invention and additional fields in which the present invention would be of significant utility.

It is therefore intended by the appended claims to cover any and all such applications, modifications and embodiments within the scope of the present invention.

What is claimed is:

1. An apparatus for detecting utensils being improperly placed in a trashcan having a top periphery forming an aperture to the trashcan, the apparatus comprising:

a mounting lip adapted to conform to the top periphery of the trashcan and adapted to removably mount to the top periphery of the trashcan to surround the aperture of the trashcan;

a funnel shaped entryway attached to the mounting lip and extending from an inside perimeter of the mounting lip;

a plurality of vertical walls attached to the funnel shaped entryway wherein the vertical walls are substantially below the mounting lip and the top periphery of the trashcan and inside surfaces of the plurality of vertical walls form an opening to the trashcan;

a detector coil coupled to and surrounding the plurality of vertical walls for detecting metal passing through the opening to the trashcan; and control electronics integrally attached outside of the mounting lip and coupled to the detector coil, the control electronics comprising:

a speaker coupled to the detector coil for providing an audio alert to a user to warn that the detector coil has detected metal passing through the opening.

2. The apparatus of claim 1 wherein the control electronics further comprises:

a light indicator coupled to the detector coil for providing an visual alert to a user to warn that the detector coil has detected metal passing through the opening.

3. The apparatus of claim 1 wherein the control electronics further comprises:

a counter display coupled to the detector coil for displaying a counter that counts the number of times the detector coil has detected metal passing through the opening.

4. The apparatus of claim 3 wherein the control electronics further comprises:

a reset control coupled to the counter display for allowing a user to reset the counter to zero.

5. The apparatus of claim 1 wherein the control electronics further comprises:

an on/off switch for turning power to the apparatus on or off.

6. The apparatus of claim 1 wherein the control electronics further comprises:

a gain adjust for adjusting the sensitivity of the detector coil.

7. An apparatus for detecting utensils being improperly placed in a trashcan having a top periphery forming an aperture to the trashcan, the apparatus comprising:

a mounting lip adapted to conform to the top periphery of the trashcan and adapted to removably mount to the top periphery of the trashcan to surround the aperture of the trashcan;

a funnel shaped entryway attached to the mounting lip and extending from an inside perimeter of the mounting lip;

a plurality of vertical walls attached to the funnel shaped entryway wherein the vertical walls are below the mounting lip and the top periphery of the trashcan and inside surfaces of the plurality of vertical walls form an opening to the trashcan;

a detector coil coupled to and surrounding the plurality of vertical walls for detecting metal passing through the opening to the trashcan; and control electronics integrally attached outside of the mounting lip and coupled to the detector coil, the control electronics comprising:

an on/off switch coupled to the detector coil for turning power on or off;

a speaker coupled to the detector coil for providing an audio alert to a user to warn that the detector coil has detected metal passing through the opening;

a light indicator coupled to the detector coil for providing an visual alert to a user to warn that the detector coil has detected metal passing through the opening;

a counter display coupled to the detector coil for displaying a counter that counts the number of times the detector coil has detected metal passing through the opening; and a gain adjust for adjusting the sensitivity of the detector coil.

8. The apparatus of claim 7 wherein the speaker for providing an audio alert to a user to warn that the detector coil has detected metal passing through the opening further comprises:

means for continuing the audio alert once the audio alert has been activated; and a reset control for resetting the means for continuing the audio alert to turn the audio alert off.

9. The apparatus of claim 7 wherein the on/off switch coupled to the detector coil for turning power on or off further comprises a key operated on/off switch for allowing only a person with a key to turn power on or off.

10. The apparatus of claim 7 wherein when the on/off switch is turned on then the counter that counts the number of times the detector coil has detected metal passing through the opening is reset to zero.

* * * * *